3,296,854
WATER PUMP TESTING APPARATUS

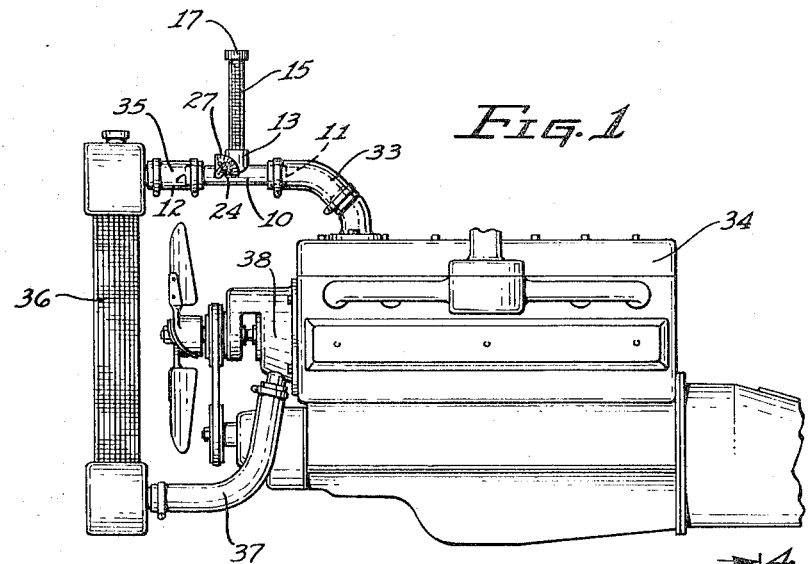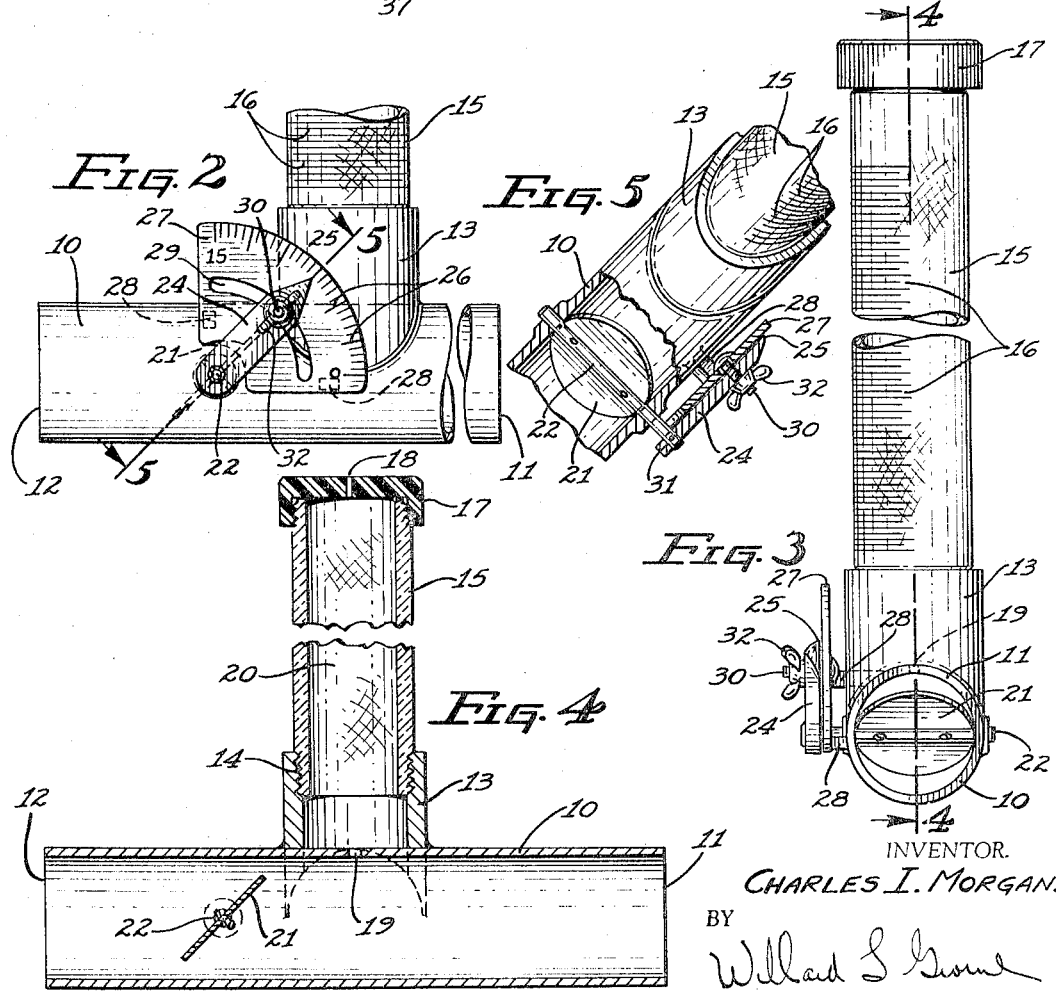

Charles I. Morgan, Scottsdale, Ariz., assignor of thirty-three and one-third percent to Bruce MacNaughton, Phoenix, Ariz.
Filed Mar. 19, 1964, Ser. No. 353,125
2 Claims. (Cl. 73—118)

This invention pertains to fluid flow indicators and is particularly directed to flow indicator for testing the water pump efficiency of an internal combustion engine cooling system.

One of the objects of this invention is to provide a water pump testing apparatus for a cooling system that is easy to install and easy to read.

Another object is to provide a water pump testing device that is simple in construction and rugged and durable in use.

A further object is to provide a water pump tester that is universally adapted to a wide range of engine conditions and types of cooling systems.

Further features and advantages of this invention will appear from a detailed description of the drawings in which:

FIG. 1 is a general view showing the water pump testing apparatus of this invention applied to the cooling system of a typical internal combustion engine.

FIG. 2 is an enlarged fragmentary side elevation of the water pump testing apparatus.

FIG. 3 is an end elevation of the apparatus shown in FIG. 2.

FIG. 4 is a sectional view on the line 4—4 of FIG. 3.

FIG. 5 is an enlarged fragmentary view on the line 5—5 of FIG. 2.

As an example of one embodiment of this invention, there is shown a water pump testing apparatus comprising a main flow pipe 10 having an input end 11 and an output end 12. An upstanding measuring tube pipe support 13 is formed integral with the main flow pipe and located intermediate the ends of the main flow pipe.

Appropriately mounted as by means of suitable pipe threads 14 in the pipe support 13 is the measuring and indicating tube 15 of transparent material and having a series of vertically spaced indicia lines and graduations 16 formed thereon. The top of the tube 15 is closed by a suitable cap 17 having a suitable vent hole 18 extending therethrough. A small metering orifice 19 is formed in the main flow pipe 10 which communicates with the interior chamber 20 of the measuring tube 15.

An adjustable butterfly valve 21 is mounted on a diametrically disposed rockshaft 22 suitably journaled in the main flow pipe 10 intermediate the output end 12 and the orifice 19 of the main flow pipe. Fixed to the outer end 23 of the rockshaft 22 is the operating and control arm 24 which has an indicator pointer end 25 which sweeps over a series of indicia graduations 26 of an index plate 27 rigidly fixed by suitable supports 28 to the main flow pipe 10. An arcuate slot 29 is formed in the index plate 27 through which extends the clamp bolt 30, the bolt extending through a hole 31 in the control arm and its outer end being provided with a clamping wing nut 32 which may be tightened to lock the control arm 24 and butterfly valve 21 in any desired angular position.

In use: the water pump testing apparatus is mounted as shown in FIG. 1 wherein the input end 11 of the main flow pipe is connected to the discharge hose 33 of the engine 34. The output end 12 of the main flow pipe 10 is connected to a hose 35 connected to the top of the cooling radiator 36 with the measuring and indicating tube 15 extending up vertically from the main flow pipe 10. Flow from the bottom of the radiator 36 passes through hose 37 to the water pump 38 to be tested on the engine 34.

With the engine operating at a desired moderate speed, the control arm is positioned to a graduation 26 on the index plate 27 corresponding to the proper setting required for the particular engine and cooling system being tested. Under these conditions, the butterfly valve 21 is adusted to provide a restriction in the main flow pipe 10 creating a pressure difference between the input end 11 to output end 12 so that radiator fluid entering the orifice 19 rises to a certain graduation 16 in the indicating tube 15. By noting the position of the liquid column in the tube 15 the efficiency of the operation of the water pump 38 at that speed can be detected. The engine may then be operated at a high speed such as encountered in open road driving and the higher level in the tube 15 noted and the efficiency of the pump checked in high speed operation. Obviously, the device can be very quickly and easily installed and dismounted to make the aforementioned tests without any alteration of the engine and cooling system.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. An apparatus for testing a conventional cooling system of an internal combustion engine having a water jacket including input and output connections, a radiator and a water pump, comprising in combination:

(A) a main straight cylindrical flow pipe placed in operative position with its input end connected to the output connection of said water jacket and an output end connected to the top input connection of said radiator, (B) a vertically disposed open top indicating standpipe tube having a chamber exposed to normal atmospheric pressure mounted intermediate said ends of said main flow pipe, (C) said main flow pipe including an orifice communicating with the bottom of said indicating standpipe tube chamber for gravity flow of fluid from said main flow pipe into and out of said chamber, (D) and a flow regulating valve in said main flow pipe located between the output end thereof and said orifice, to cause a pressure drop from said input end to said output in said main flow pipe so that the fluid flowing in said main flow pipe enters and discharges through said orifice in said indicating standpipe tube chamber.

2. In a testing apparatus as set forth in claim 1 wherein there is provided a means on said main flow pipe manually adjustable to vary the flow and pressure drop therethrough and thereby the flow through said orifice and the height in said chamber of said indicating standpipe tube including means for positioning and securing said flow regulating means in desired selected position.

References Cited by the Examiner
UNITED STATES PATENTS

| | | | |
|---|---|---|---|
| 381,373 | 4/1888 | Herschel | 73—213 |
| 1,324,620 | 12/1919 | Rosenberg. | |
| 1,382,388 | 6/1921 | Royer | 73—212 |
| 2,018,403 | 10/1935 | Hussar | 73—118 |
| 2,595,470 | 5/1952 | Langfeld et al. | 73—49.7 |
| 2,858,697 | 11/1958 | Entwistle | 73—118 X |
| 3,196,673 | 7/1965 | Carson | 73—118 |

DAVID SCHONBERG, *Primary Examiner.*